(12) United States Patent
Ranjan et al.

(10) Patent No.: US 7,437,695 B1
(45) Date of Patent: Oct. 14, 2008

(54) METHOD OF MEMORY AND RUN-TIME EFFICIENT HIERARCHICAL TIMING ANALYSIS IN PROGRAMMABLE LOGIC DEVICES

(75) Inventors: Abhishek Ranjan, Campbell, CA (US); David A. Knol, San Jose, CA (US); Salil R. Raje, Saratoga, CA (US)

(73) Assignee: Xilinx, Inc., San Jose, CA (US)

( * ) Notice: Subject to any disclaimer, the term of this patent is extended or adjusted under 35 U.S.C. 154(b) by 325 days.

(21) Appl. No.: 11/100,290

(22) Filed: Apr. 5, 2005

Related U.S. Application Data

(63) Continuation-in-part of application No. 10/800,042, filed on Mar. 12, 2004, now Pat. No. 7,146,595, which is a continuation of application No. 10/792,164, filed on Mar. 3, 2004, now Pat. No. 7,073,149.

(51) Int. Cl.
*G06F 17/50* (2006.01)
(52) U.S. Cl. .................. 716/6; 716/4; 716/5; 703/19
(58) Field of Classification Search ............... 716/4–6; 703/19
See application file for complete search history.

(56) References Cited

U.S. PATENT DOCUMENTS

| | | | |
|---|---|---|---|
| 5,140,526 A | 8/1992 | McDermith et al. | |
| 5,452,228 A | 9/1995 | Arakawa et al. | |
| 5,452,239 A | 9/1995 | Dai et al. | |
| 5,461,576 A | 10/1995 | Tsay et al. | |
| 5,499,191 A | 3/1996 | Young | |
| 5,513,119 A | 4/1996 | Moore et al. | |
| 5,617,327 A | 4/1997 | Duncan | |
| 5,634,050 A | 5/1997 | Krueger et al. | |
| 5,648,913 A | 7/1997 | Bennett et al. | |
| 5,659,484 A | 8/1997 | Bennett et al. | |
| 5,696,693 A | 12/1997 | Aubel et al. | |
| 5,991,523 A | 11/1999 | Williams et al. | |
| 6,009,251 A | 12/1999 | Ho et al. | |
| 6,086,621 A * | 7/2000 | Ginetti et al. | .................. 703/19 |
| 6,145,117 A | 11/2000 | Eng | |
| 6,170,080 B1 | 1/2001 | Ginetti et al. | |
| 6,189,131 B1 | 2/2001 | Graef et al. | |
| 6,190,080 B1 * | 2/2001 | Lee | ............................ 716/18 |
| 6,223,329 B1 | 4/2001 | Ling et al. | |
| 6,317,863 B1 | 11/2001 | Segal | |

(Continued)

OTHER PUBLICATIONS

U.S. Appl. No. 11/152,502, filed Jun. 14, 2005, Knol et al.

(Continued)

*Primary Examiner*—Jack Chiang
*Assistant Examiner*—Naum B Levin
(74) *Attorney, Agent, or Firm*—Kevin T. Cuenot

(57) ABSTRACT

A method of performing timing analysis on a circuit design for an integrated circuit (IC) can include selecting a physical portion of the IC that includes at least one instance of a logic hierarchy and generating a local timing constraint specific to the physical portion. The method also can include creating a software representation of the physical portion of the IC. The software representation can specify the local timing constraint and a shell netlist for the physical portion. The method further can include performing a timing analysis upon, at least part of, the circuit design using the software representation.

10 Claims, 6 Drawing Sheets

U.S. PATENT DOCUMENTS

| | | | |
|---|---|---|---|
| 6,408,422 | B1 | 6/2002 | Hwang et al. |
| 6,487,708 | B1 | 11/2002 | Canaris |
| 6,505,323 | B1 | 1/2003 | Lipton et al. |
| 6,530,070 | B2 | 3/2003 | Kruse |
| 6,618,834 | B2 | 9/2003 | Takeyama et al. |
| 6,622,290 | B1 * | 9/2003 | Ginetti et al. ............... 716/6 |
| 6,622,291 | B1 * | 9/2003 | Ginetti ............... 716/9 |
| 6,631,508 | B1 | 10/2003 | Williams |
| 6,684,376 | B1 | 1/2004 | Kerzman et al. |
| 6,711,729 | B1 | 3/2004 | McElvain et al. |
| 6,817,005 | B2 | 11/2004 | Mason et al. |
| 6,845,494 | B2 | 1/2005 | Burks et al. |
| 7,013,438 | B1 * | 3/2006 | Saldanha et al. ............... 716/2 |
| 7,103,863 | B2 * | 9/2006 | Riepe et al. ............... 716/7 |
| 7,188,327 | B2 * | 3/2007 | Hahn ............... 716/6 |
| 2004/0078767 | A1 | 4/2004 | Burks et al. |
| 2005/0268269 | A1 | 12/2005 | Coiley |

OTHER PUBLICATIONS

U.S. Appl. No. 10/892,612, filed Jul. 16, 2004, Knol et al.
U.S. Appl. No. 10/892,613, filed Jul. 16, 2004, Knol et al.
U.S. Appl. No. 11/100,290, filed Apr. 5, 2005, Ranjan et al.
Sarkar et al., "Routability-driven repeater block planning for interconnect-centric floorplanning", Computer-Aided Design of Integrated Circuits and Systems, IEEE Transactions on vol. 20, Issue 5, May 2001 pp. 660-671.
Cong et al., "Buffer block planning for interconnected-driven floorplanning", Computer-Aided Design, 1999, Digest of Technical Papers, 1999 IEEE/ACM International Conference on Nov. 7-11, 1999, pp. 358-363.
Ranjan et al., "Fast hierarchical floorplanning with congestion and timing control", Computer Design, 2000, Proceedings 2000 International Conference Sep. 17-20, 2000, pp. 357-362.
U.S. Appl. No. 11/099,887, Knol et al., filed Apr. 5, 2005, entitled "Partitioning a Large Design Across Multiple Devices", 25 pgs., Xilinx, Inc., 2100 Logic Drive, San Jose, CA 95124.
Hiwatashi, T. et al., "An interactive/automatic floor planner for hierarchically designed cell bases VLSIs", Custom Integrated Circuits Conference, 1990, Proceedings of the IEEE 1990., May 13-16, 1990, pp. 30.4/1-30.4/4.
U.S. Appl. No. 10/800,042, filed Mar. 12, 2004, Knol et al.
U.S. Appl. No. 10/792,164, filed Mar. 3, 2004, Knol et al.
Wang, Maogang, et al., Multi-Million Gate FPGA Physical Design Challenges, ICCAD, Nov. 1003, pp. 891-898, available from Xilinx, Inc., 2100 Logic Drive, San Jose, CA 95124.

* cited by examiner

METHOD OF MEMORY AND RUN-TIME EFFICIENT HIERARCHICAL TIMING ANALYSIS IN PROGRAMMABLE LOGIC DEVICES

CROSS-REFERENCE

This application is a continuation-in-part of Ser. No. 10/792,164 U.S. Pat. No. 7,073,149, filed Mar. 3, 2004 and issued Jul. 4, 2006, entitled "System for Representing the Logical and Physical Information of an Integrated Circuit", by David A. Knol, et. al., and a continuation-in-part of Ser. No. 10/800,042 U.S. Pat. No. 7,146,595, filed Mar. 12, 2004 and issued Dec. 5, 2006, entitled "Data Structures for Representing the Logical and Physical Information of an Integrated Circuit", by David A. Knol, et. al., both of which are herein incorporated by reference in their entirety.

BACKGROUND

1. Field of the Invention

This invention relates to the field of electronic circuit design and, more particularly, to timing analysis for circuit designs implemented with integrated circuits.

2. Description of the Related Art

A programmable logic device (PLD) is a type of integrated circuit (IC), that can be programmed to perform specified logic functions. Other types of ICs can include application specific integrated circuits (ASICs) and application specific standard products (ASSPs). Modern PLDs, for example, are large, complex devices that can be programmed to perform a range of different functions. Conventional circuit design techniques traditionally task one designer, or design team, with developing a circuit design for a given IC. As ICs have become more complex, however, so too have the circuit designs intended to be used with such devices.

In consequence, a technique referred to as modular design has been gaining in popularity. Modular design seeks to reduce or minimize the complexity of circuit design. Modular design refers to the subdivision of a circuit design into several different modules, or sub-circuits. Each module can be assigned to one or more designers, or teams of designers, as the case may be. This technique allows each team to direct its efforts to one aspect of the design, i.e. its assigned module. Subsequently, the modules developed by each design team can be brought together and combined to form the completed circuit design.

In light of the popularity of modular design, some design tools have begun offering modular design functions. These tools, however, suffer from several limitations, particularly relating to timing analysis. One such limitation relates to local timing analysis. Conventional design tools tend to be inaccurate when performing module level timing analysis. Such is the case as conventional design tools do not provide a means of apportioning global timing constraints for a circuit design to individual modules. In other words, while timing constraints can be applied on a global level, conventional design tools are unable to accurately determine which portions of global design constraints are attributable to a given module. Without the ability to accurately translate global timing constraints to local timing constraints, it becomes unlikely that global timing constraints will be met when individual modules are combined.

Another limitation of conventional design tools relates to global timing analysis. Specifically, performing global timing analysis often is costly in terms of time and computing resources. When performing timing analysis for an entire circuit design, conventional design tools consider the complete implementation details for each module of the design. This means that the netlist for the entire circuit design, or the netlist for each module of the design, must be considered. Netlists, however, tend to be large in size, requiring significant memory to store and process. The netlists must be loaded into memory and processed to compute path delays which then can be compared with the global timing constraints. In some cases, this process can take hours to complete.

It would be beneficial to have a design methodology which facilitates modular design for ICs in a manner that overcomes the deficiencies described above.

SUMMARY OF THE INVENTION

The present invention provides a solution for efficiently and accurately performing timing analysis on integrated circuits (ICs). One embodiment of the present invention can include a method of performing timing analysis on a circuit design for an IC. The method can include selecting a physical portion of the IC, such as one represented by a data structure, such as pblock, that includes at least one instance of a logic hierarchy. In general, a pblock is a software construct, which represents a hierarchical physical instance corresponding to a physical area on the IC. A local timing constraint that is specific to the physical portion can be generated and a software representation of the physical portion of the IC can be created. The software representation can specify the local timing constraint and a shell netlist for the physical portion. A timing analysis can be performed upon, at least part of, the circuit design using the software representation.

In one embodiment, a global timing constraint of the circuit design can be modified thereby resulting in the local timing constraint. The local timing constraint can pertain only to the physical portion of the IC. The global timing constraint can be modified by determining a part of the global timing constraint that is attributable to the physical portion of the IC. In illustration, the global timing constraint can be associated with a defined signal path. The part of the global timing constraint that is attributable to the physical portion can be determined using a function that depends, at least in part, upon a delay estimate of the defined signal path and a delay estimate for a part of the defined signal path within the physical portion of the IC.

In another embodiment, the local timing constraint need not be derived from a global timing constraint. Still, the local timing constraint can pertain only to the physical portion of the IC.

As noted, the physical portion of the IC can be represented by a pblock. The shell netlist can specify top level ports of the pblock and elements disposed in signal paths extending from each of the top level ports of the pblock up to, and including, first level storage elements within the pblock. The software representation further can include delays of nets specified in the shell netlist.

Another embodiment of the present invention can include a method of performing timing analysis on a circuit design for an IC including generating at least one local timing constraint for a pblock of the circuit design and determining a shell netlist for the pblock. The method further can include defining a software-based model of the pblock and associating the shell netlist and the at least one local timing constraint with the software-based model. A netlist for the pblock can be replaced with the software-based model when estimating timing information for, at least a part of, the circuit design.

The software-based model can specify a physical area of the IC and logical attributes. In one embodiment, a global timing constraint can be translated into a local timing constraint for the pblock. In another embodiment, the local timing constraint need not be derived from a global timing constraint, but still can pertain only to the pblock. In any case, the shell netlist can specify top level ports of the pblock, nets, and combinational logic extending from each top level port up to, and including, first level storage elements within the pblock.

Yet another embodiment of the present invention can include a method of performing timing analysis on a circuit design for an IC including apportioning at least one global timing constraint to a pblock, creating a physical and logical model (PALM) of the pblock, and generating a shell netlist for the PALM. Within the PALM, delay information for nets specified by the shell netlist can be included. The method also can include using the PALM in place of a netlist for the pblock when performing a timing analysis on, at least a part of, the circuit design.

In one embodiment, routing information for nets specified in the shell netlist can be specified by the PALM. The shell netlist also can specify top level ports of the pblock and elements disposed in signal paths extending from each of the top level ports of the pblock up to, and including, first level storage elements of the pblock.

The local timing constraint can be created from the global timing constraint such that the local timing constraint is dependent only upon the pblock. The global timing constraint can be associated with a defined signal path. Accordingly, the local timing constraint for the pblock can be calculated according to a function including an estimate of a delay of the defined signal path. The function also can include, or depend upon, an estimate of a delay of a portion of the defined signal path that is within the pblock. The function can utilize a ratio of the estimate of the delay of the portion of the defined signal path that is within the pblock to the estimate of the delay of the defined signal path.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention provides a solution for more efficiently and accurately performing timing analysis on integrated circuits (ICs) including programmable logic devices (PLDs) such as field programmable gate arrays (FPGAs), application specific integrated circuits (ASICs), and application specific standard products (ASSPs). In accordance with the inventive arrangements disclosed herein, physical portions of an IC can be represented by a software construct. In one embodiment, software constructs such as pblocks can be used to represent portions of the IC. In general, a pblock is a data structure that represents a hierarchical physical instance corresponding to a defined area on a device. To facilitate accurate timing analysis, particularly when using a modular design methodology, global timing constraints can be apportioned to the various pblocks. Pblocks can be exported along with the apportioned timing constraints for purposes of performing timing analysis at the modular level.

In another embodiment, another software construct, referred to as a physical and logical model (PALM), can be used. A PALM can include a reduced set of information as compared to a pblock. In one embodiment, only that information which is required for purposes of performing timing analysis need be specified by the PALM. Accordingly, when timing analysis is performed, the PALM can be used in lieu of other, more complex representations of the selected portion of the IC, i.e. fully specified netlists. By using PALMs, which require less memory to store and are more easily manipulated than netlists, the time required for performing timing analysis can be reduced.

The inventive arrangements also facilitate increased accuracy when performing timing analysis. Global timing constraints, which are applicable to the entire IC, can be apportioned to individual pblocks and PALMs. This capability allows a timing analysis to be performed for individual portions of a circuit design with increased accuracy. In consequence, more accurate and rapid determinations as to whether a circuit design will meet global timing constraints can be performed earlier within the design process.

Figure 1:
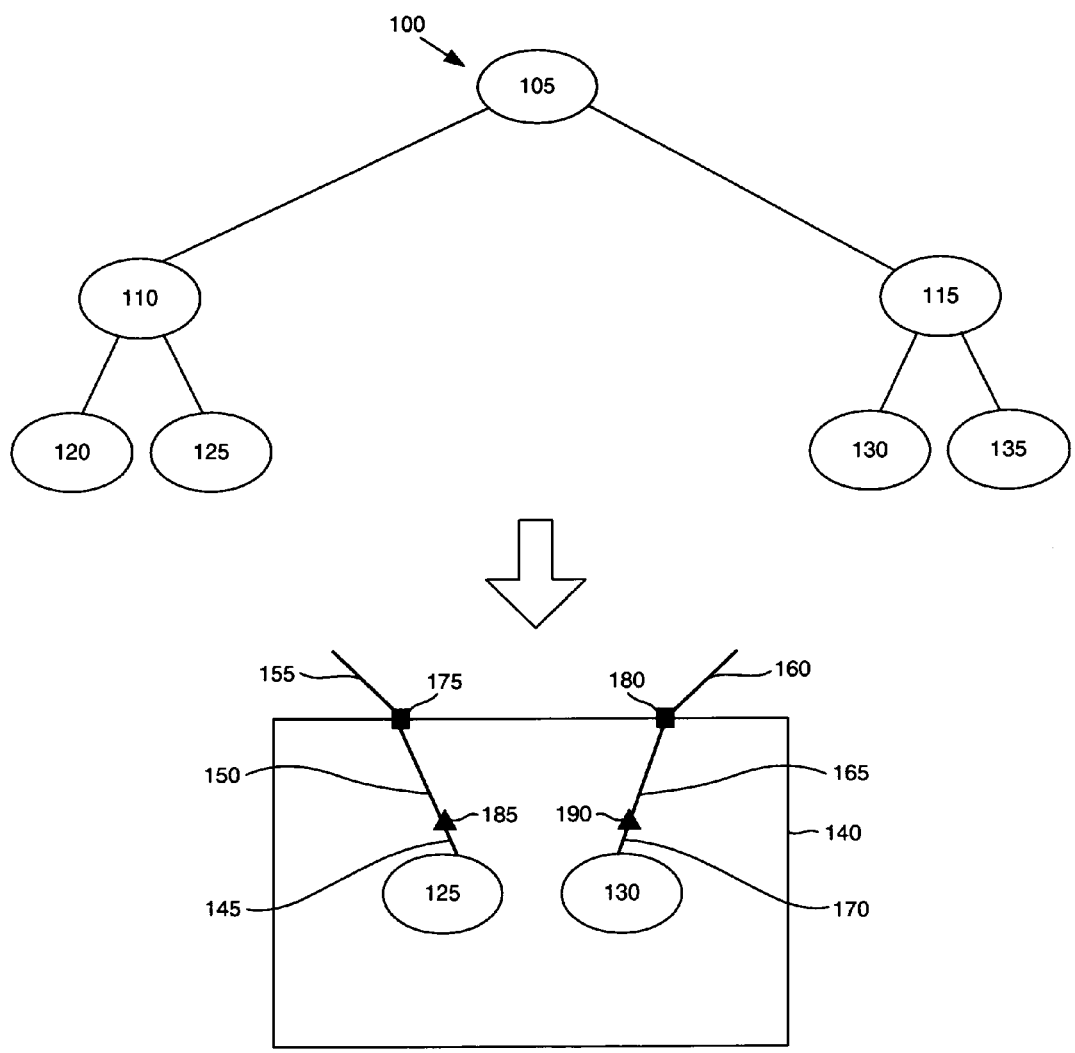
FIG. 1 is a schematic diagram illustrating the modularization of a design in accordance with one embodiment of the present invention.

FIG. 1 is a schematic diagram illustrating the modularization of a design 100 in accordance with one embodiment of the present invention. The design 100 can be expressed as a netlist, or other software-based circuit representation. As known, a netlist specifies the various logic blocks, or instances, of a design as well as how those logic blocks are to be interconnected. The netlist does not, however, specify where logic blocks are to be located on a physical device or which routing resources, i.e. physical nets, are to be used to connect the logic blocks.

A circuit design, such as design 100, can be thought of as a collection of hierarchies of logic blocks, with top level logic blocks being composed of lower level logic blocks. Each logic hierarchy can be represented as a branch of a graph where logic blocks, also referred to as instances of logic blocks or instances, are represented by nodes. The nodes can be organized such that all branches of the graph extend from a single root node. Within each branch, child nodes depend from parent nodes. Each branch can begin at the root node and extend down multiple levels terminating at leaf nodes. The graph can include many different levels depending upon the complexity of the logic hierarchies. Thus, as shown, the design 100 can include a root node 105 with two different logic hierarchies extending from the root node 105. The first logic hierarchy is represented by node 110 and the second by node 115. Each logic hierarchy can include further child nodes. Accordingly, parent node 110 has two child nodes 120 and 125 and parent node 115 has two child nodes 130 and 135.

In illustration, one example of a top level logic block in a design can be a microprocessor. The microprocessor can be represented by a top level node located just below the root node. The branch identified by the top level node specifies all of the components necessary to describe the microprocessor in increasing detail. The level immediately below the top level node can specify the Arithmetic Logic Units (ALUs) of the microprocessor. Each ALU is represented by a node on the level below the top level node. That is, each ALU node is a child of the top level microprocessor node. Each ALU node also can function as a parent node having child nodes representing the adders that are combined to form the ALUs. Each adder node also can have child nodes representing the individual logic gates, i.e. NAND and OR gates, used to form the adders.

Another example of a top level logic block can be an MP3 player. In that case, sub-nodes can represent components such as microprocessors, data buses, and digital signal processing blocks. Any of a variety of different systems, when viewed at a functional level, can be considered a logic hierarchy. As such, the present invention is not intended to be limited by the examples described herein. Rather, it should be appreciated that the examples have been provided for purposes of illustration only and that other functions and/or systems that can be implemented in an IC can be considered a logic hierarchy.

Instances from the logic hierarchies can be assigned to a physical area on an IC. Such physical areas can be represented by software constructs called pblocks. A pblock represents a hierarchical physical instance corresponding to a defined area on a device. Each pblock can be assigned instances from a same logic hierarchy or from two or more different logic hierarchies. Thus, the area defined by a pblock, entire logic hierarchies, or subparts thereof, can be assigned. Each pblock, once created, can be allocated, or assigned, to any physical location on a particular device. Pblocks can be sized according to the resources needed by the instances assigned to each pblock. Pblocks do not alter the logic hierarchy or logical netlist.

As shown in FIG. 1, a pblock 140 can be assigned instances 125 and 130. As instances 125 and 130 are assigned to pblock 140, other structures can be created as well. As shown, nets 145, 150, 155, 160, 165, and 170 can be created automatically to link the instances with other portions of the IC. Further, pblock ports 175 and 180 can be automatically included as well as buffers 185 and 190. The pblock ports 175 and 180 are software constructs representing boundary pins which help maintain a complete, physical hierarchy. That is, a pblock port indicates a location on a net and does not correspond to, or indicate, a physical port or pin on the PLD. Rather, it indicates the location of the boundary of the pblock passing through the net in which the pblock port is located. This hierarchy maintains the same functionality and connectivity defined in the original logical netlist or logical hierarchy. Each port can link to a net external to the pblock and a net internal to the pblock, thereby helping to encapsulate the pblock as a standalone portion of the circuit design 100, i.e. a sub-circuit. The locations of the ports can be adjusted manually as may be required.

One or more software-based circuit design tools executing within an information processing system can be used to process the design 100 and carry out the various steps described herein. Such a design tool can be configured to perform floorplanning functions. In one embodiment, the design tool can be implemented as the PlanAhead Hierarchical Floorplanner (PlanAhead) available from Xilinx, Inc. of San Jose, Calif. PlanAhead provides hierarchical, block-based, modular, and incremental design functions. The incremental design functionality of the tool can lock portions the placement of a design, thereby allowing the place and route functions of the tool to focus only on logic blocks that have changed from one iteration to the next. This can significantly reduce the time needed for physical design. Generally, the number of design iterations necessary, as well as the time needed to perform each iteration, can be reduced.

Figure 2:
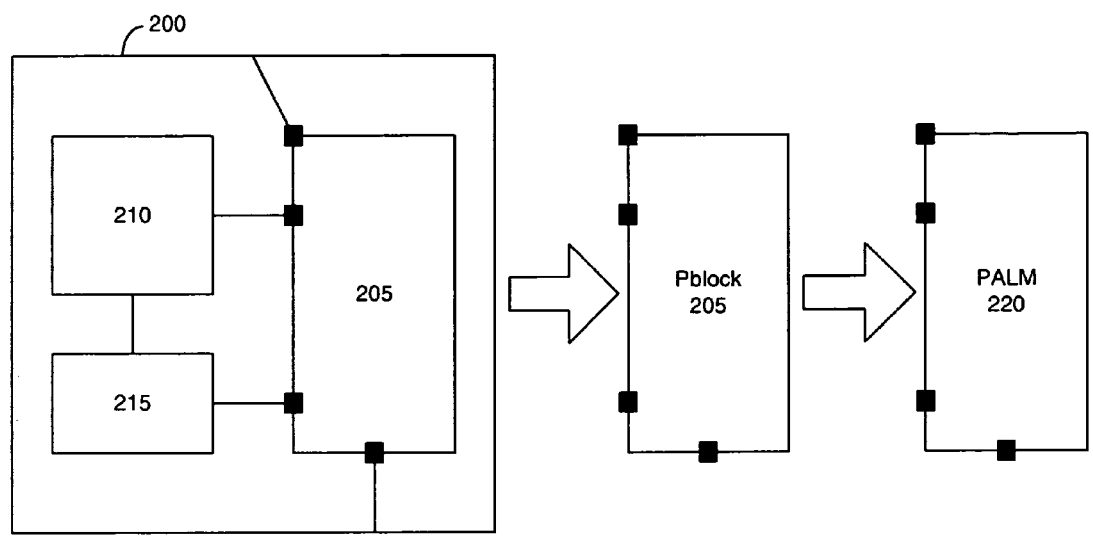
FIG. 2 is a schematic diagram illustrating an integrated circuit (IC) including several pblocks in accordance with the inventive arrangements disclosed herein.

FIG. 2 is a schematic diagram illustrating an IC 200 comprising several pblocks in accordance with the inventive arrangements disclosed herein. As shown, pblocks 205, 210, and 215 can be created and assigned to portions of IC 200. Each of the pblocks 205-215 can include one or more instances of logic hierarchies (not shown). As discussed with reference to FIG. 1, a pblock such as pblock 205 can include one or more instances, nets linking the instances with one another if needed, and nets linking the instances with other portions of the IC, such as pblocks 210 and 215. The pblocks further can specify pblock ports and buffers.

A pblock can specify a complete netlist for the portion of the circuit, or sub-circuit, contained therein. Each pblock can be independently optimized and further can specify an accurate snapshot of global timing constraints as those timing constraints apply to the individual pblock. Once assigned to a particular pblock, the instances and nets contained therein can be locked such that pblocks can be moved to different physical locations on the IC, or reused in other designs. As each pblock is configured to include buffers and ports as illustrated with reference to FIG. 1, each is self-contained, thereby facilitating modular design.

While pblocks can facilitate efficient modular design, pblocks also can include more information than is necessary for performing timing analysis. This can be particularly true with respect to global timing analysis. Accordingly, another software-construct, referred to as a PALM, can be created. The reduced information set specified by a PALM requires less memory and computing resources to process when performing timing analysis. Accordingly, timing analysis becomes a faster and more efficient process.

In FIG. 2, PALM 220 has been created to represent pblock 205. PALM 220 can include a reduced set of information as compared to the pblock 205 from which it was derived. In one embodiment of the present invention, PALM 220 can include only that information which is necessary for performing a timing analysis upon the circuit design, i.e. a global timing analysis. The PALM 220 can include a shell netlist for pblock 215 as well as delays for the nets specified in the shell netlist. While the shell netlist can be specified in Electronic Design Interchange Format (Edif), the present invention is not limited to the use of any particular protocol or data format.

Figure 3:
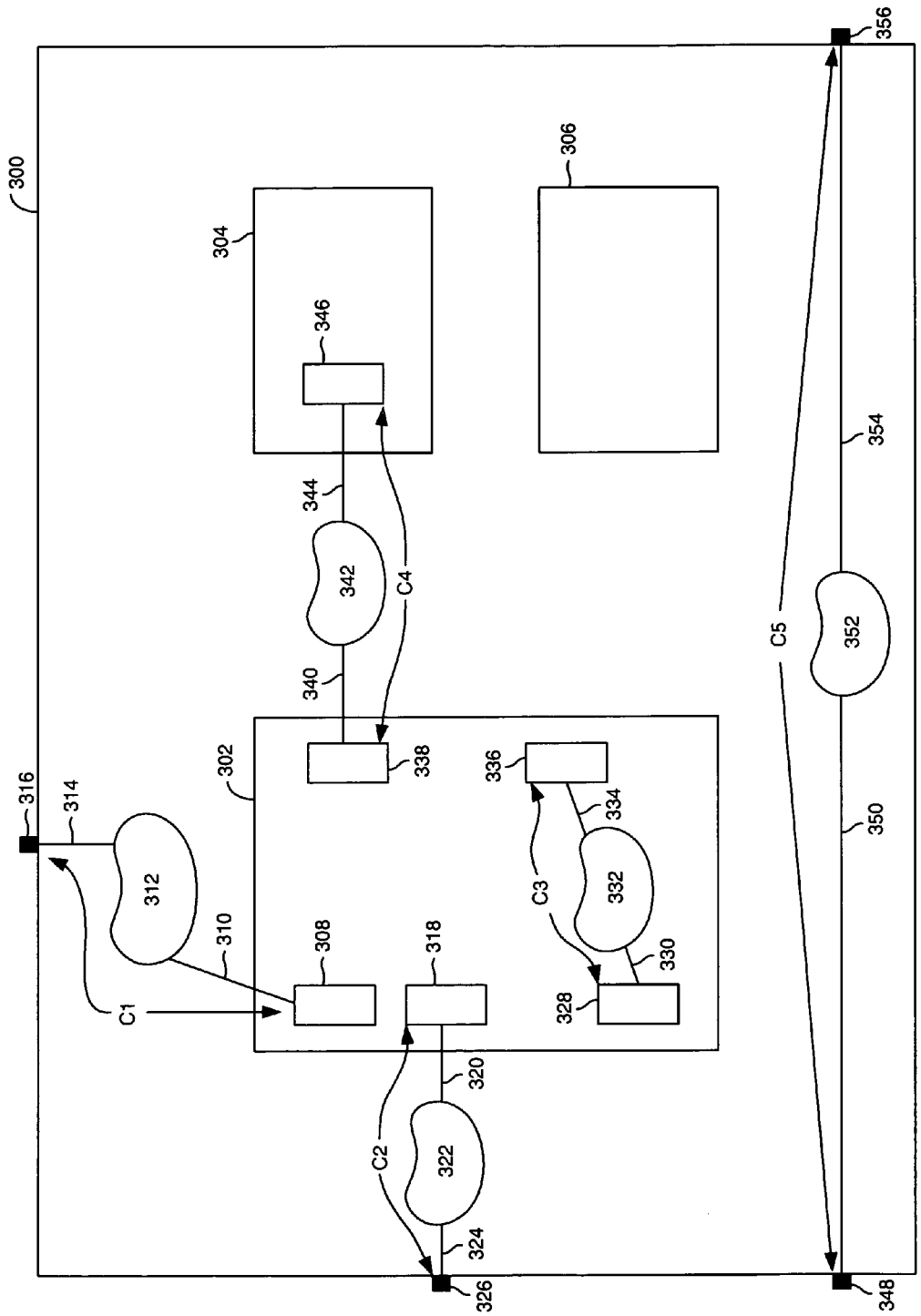
FIG. 3 is a schematic diagram illustrating the generation of timing constraints for pblocks in accordance with the inventive arrangements disclosed herein.

FIG. 3 is a schematic diagram illustrating the generation of timing constraints for pblocks in accordance with the inventive arrangements disclosed herein. In creating a PALM representation, global timing constraints can, but need not, be apportioned to individual pblocks. As shown, pblocks 302, 304, and 306 have been created and assigned to locations on an IC 300. Various timing constraints denoted as C1, C2, C3, C4, and C5 have been associated with the design being implemented in IC 300. The timing constraints C1-C5 can be considered top level, or global, constraints in that each constraint pertains to the IC as a whole and is not intentionally limited in its application to a single pblock.

Timing constraint C1 describes the timing requirements that must be met with respect to the signal path beginning at flip flop 308 continuing through net 310, combinational logic 312, net 314, and ending at input port 316. Timing constraint C2 describes the timing requirements that must be met with respect to the signal path beginning at flip flop 318, continuing through net 320, combinational logic 322, net 324, and ending at output port 326. Timing constraint C3 describes the timing requirements that must be met with respect to the signal path beginning at flip flop 328, continuing through net 330, combinational logic 332, net 334, and ending at flip flop 336.

Timing constraint C4 describes the timing requirements that must be met with respect to the signal path beginning at flip flop 338, continuing through net 340, combinational logic 342, net 344, and ending at flip flop 346. Finally, timing constraint C5 describes the timing requirements that must be met with respect to the signal path beginning at input port 348, continuing through net 350, combinational logic 352, net 354, and ending at output port 356. Each of the timing constraints C1-C5 falls into one of four general categories of timing constraints. The four general categories are as follows: (1) input port to output port; (2) input port to flip flop; (3) flip flop to output port; and (4) flip flop to flip flop.

From the top level constraints, new constraints that are specific to each pblock, or at least one selected pblock, must be generated. For purposes of illustration, generation of timing constraints for pblock 302 will be discussed. The resulting timing constraints can be said to be specific to pblock 302, or referred to as constraints that are local to pblock 302. From a review of timing constraints C1-C5, it can be seen that C1, C2, and C4 must be modified if pblock 302 is to be considered independently from any other portions of IC 300. Timing constraint C3, as it pertains to a signal path completely within pblock 302 need not be modified. Accordingly, timing constraint C3 is already local to pblock 302. Timing constraint C5, as it lies completely external to pblock 302, need not be modified is it does not relate to pblock 302.

Referring again to timing constraints C1, C2, and C4, each has some initial delay value that can be apportioned to pblock 302 and a delay value that relates to those portions of the signal paths that are external to, or independent of, pblock 302. The process of assigning a portion of a timing constraint to a pblock can be referred to as delay budgeting.

Figure 4:
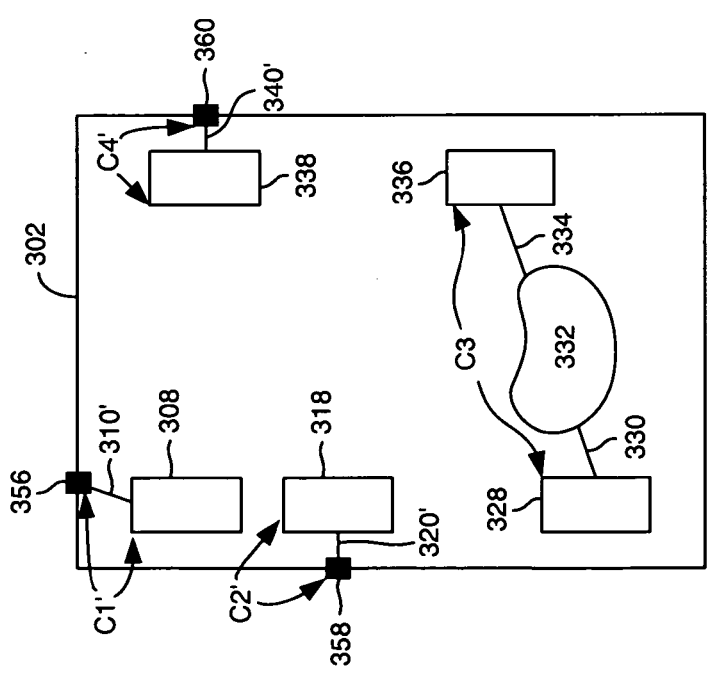
FIG. 4 illustrates the generation of local level timing constraints pertaining to a particular pblock from top level timing constraints in accordance with the inventive arrangements disclosed herein.

FIG. 4 illustrates the generation of local timing constraints pertaining to pblock 302 from top level, or global, timing constraints in accordance with the inventive arrangements disclosed herein. In general, top level timing constraints can be modified, with reference to a selected pblock, so that each reflects only those portions of the timing constraint that can be allocated to the selected pblock, in this case pblock 302. The process of modifying each of top level timing constraints C1, C2, and C4 is similar.

FIG. 4 illustrates the local timing constraints C1', C2', and C4' that have been derived from global timing constraints C1, C2, and C4 respectively. As shown, timing constraint C1' has been limited to the signal path beginning at flip flop 308, continuing through the portion of net 310 which lies within pblock 302, indicated by 310', and ending at pblock port 356. Timing constraint C2 has been modified to begin at flip flop 318, continue through the portion of net 320 within pblock 302, referred to as 320', and end at pblock port 358. Similarly, timing constraint C4 has been modified to begin at flip flop 338, continue through the portion of net 340 within pblock 302, referred to as 340', and end at pblock port 360. Since global timing constraint C3 lies entirely within pblock 302, no modification is necessary. That is, global timing constraint C3 is also a local timing constraint for pblock 302.

As noted, the pblock ports 356, 358, and 360 can be created when instances are added to a pblock. The pblock ports represent boundary pins which help maintain the independence of the pblock from the remainder of the circuit design. Each pblock port can link to a net external to the pblock and a net internal to the pblock, thereby helping to encapsulate the pblock as a standalone portion of the circuit design, i.e. a sub-circuit.

Figure 5:
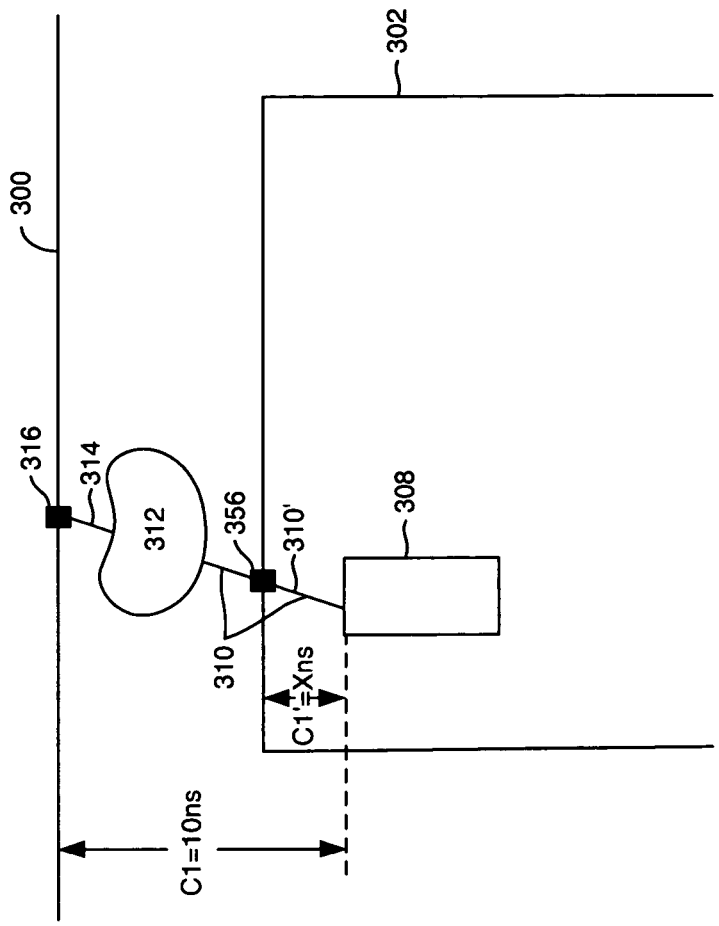
FIG. 5 is a schematic diagram illustrating an excerpted portion of the IC of FIG. 3.

FIG. 5 is a schematic diagram illustrating an excerpted portion of the IC 300 of FIG. 3. FIG. 5 illustrates an embodiment of the present invention in which global timing constraints are translated into local timing constraints. Since top level timing constraints can be modified in similar fashion with respect to one another, for purposes of illustration, modification of global timing constraint C1 will be described herein in greater detail.

As shown, timing constraint C1 has been set to 10 ns. The 10 ns. timing constraint, however, applies to the entire signal path beginning from flip flop 308, continuing through net 310, combinational logic 312, net 314, and ending at output port 316. In order to transform timing constraint C1 into one that is specific to pblock 302, denoted as C1', the portion of the timing constraint C1 that pertains only those portions of the signal path that are contained within pblock 302 must be determined. In this case, the portion of the signal path within pblock 302 begins with flip flop 308, continues through a portion of net 310 indicated by 310', and ends at pblock port 356. Local timing constraint C1' can correspond to the delay from flip flop 308 to pblock port 356.

According to one embodiment of the present invention, the delay for timing constraint C1' can be determined using estimates of the delays for various portions of the signal path. More particularly, since the timing constraint of the entire signal path is known for C1, a ratio can be used to calculate the portion of C1 that should be apportioned to C1', i.e. the local timing constraint for pblock 302. In one embodiment, for example, the following equation can be used: $X=C1*[(path\ delay\ 1)/(path\ delay\ 2)]$, where X is the timing constraint for C1', path delay 1 is the path delay from pblock port 356 to flip flop 308, and path delay 2 is the path delay from output port 316 to flip flop 308.

While the delays for gates are pre-known, delays associated with nets must be calculated. Correct net delays are known only after the design has been routed. Accordingly, in early design stages, it becomes necessary to estimate the delays for nets. A variety of different techniques exists for estimating net delays. Accordingly, any suitable method of estimating net delays can be used to determine net delay estimates when calculating values for path delays 1 and 2. This ratio, when applied to timing constraint C1, provides an estimate of the amount of global timing constraint C1 that can be apportioned, or is attributable, to pblock 302. Accordingly, top level timing constraint C1 has been transformed into a local timing constraint C1' which is specific to pblock 302. Timing constraint C1' does not depend upon any portions of IC 300 outside of pblock 302.

Once timing constraints are transformed as described, pblock 302 can be considered a self-contained entity. That is, timing analysis can be performed upon pblock 302 without reference to the remainder of the circuit design or IC 300. This allows a designer to quickly go through multiple design iterations as the time needed to analyze pblock 302 is reduced by comparison to performing timing analysis upon the entire IC 300 or circuit design.

Figure 6:
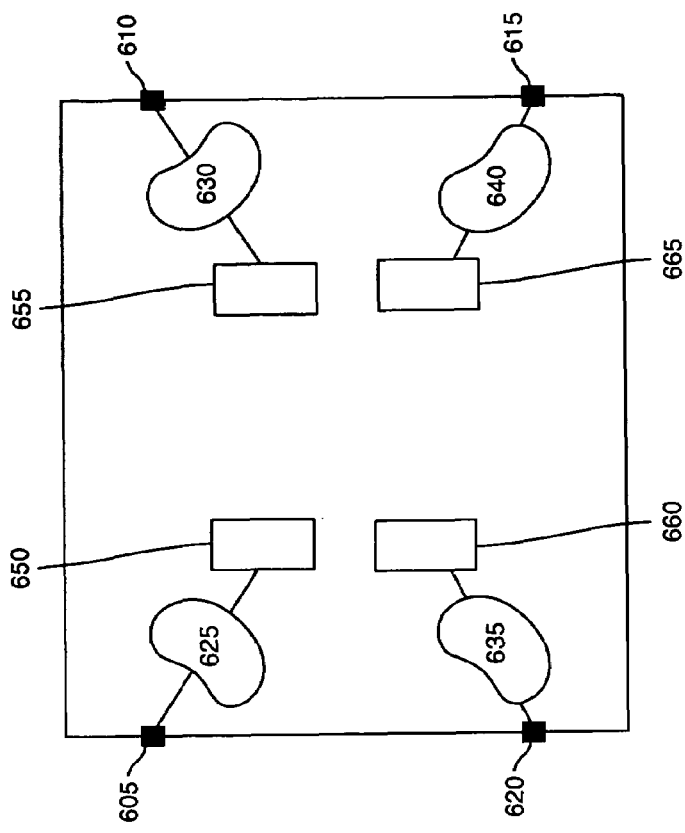
FIG. 6 is a schematic diagram illustrating an embodiment of a pblock in accordance with the inventive arrangements disclosed herein.

FIG. 6 is a schematic diagram illustrating an embodiment of a pblock 600 in accordance with the inventive arrangements disclosed herein. Pblock 600 can be associated with, or specify, a netlist. The netlist specifies all connectivity associated with pblock 600. Accordingly, any instances located within pblock 600 can be specified as well as the interconnections, or nets, between each instance. The netlist further can indicate how each entity is connected to other instances or structures located outside of pblock 600. Thus, as shown, the netlist for pblock 600 can specify pblock ports 605, 610, 615, and 620, as well as combinational logic 625, 630, 635, 640, and 645. Further the netlist can specify flip flops 650, 655, 660, and 665 as well as any physical nets connecting the flip flops, pblock ports, and combinational logic included therein.

Figure 7:
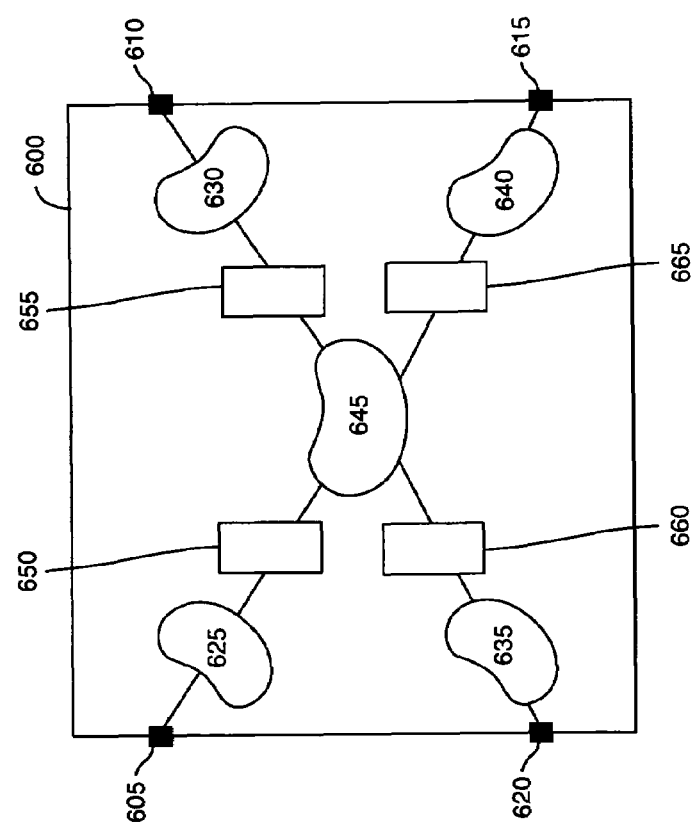
FIG. 7 is a schematic diagram illustrating an embodiment of a physical and logical model (PALM) representation of the pblock of FIG. 6.

FIG. 7 is a schematic diagram illustrating an embodiment of a PALM 700 representation of the pblock shown in FIG. 6. The PALM 700, in general, is an abstraction of pblock 600. As noted, a PALM can include information which is necessary to perform timing analysis for the full circuit design. The PALM 700 can include an interface netlist and delays of all nets specified in the interface netlist. The interface netlist can specify logic starting with the PALM ports, continuing down signal paths through any combinational logic, up to, and including, a first storage element, called a first level storage element, in each signal path. Palm ports can correspond to the ports of the pblock from which the PALM was derived on a one-to-one basis. Examples of first level storage elements can include, but are not limited to, flip flops, RAMs, multipliers, digital signal processors, processors, or other components including some sort of memory. Thus, as shown, the interface netlist for PALM 700 specifies ports 605, 610, 615, and 620, combinational logic 625, 630, 635, and 640, as well as flip flops 650, 655, 660, and 665. Only those nets used to connect the ports with flip flops are specified by the shell netlist. Other internal nets and/or instances are not specified.

A PALM can be created at any of a variety of stages within the circuit design process. Accordingly, the degree of accuracy of the delays of the nets specified in the netlist can vary according to the particular stage of circuit design in which the PALM is generated. Further, though not shown, a PALM can be configured to store additional information including, but not limited to, the number of different types of resources within the pblock, any modified timing constraints as specified by a designer, and routing information in varying specificity depending upon the stage of the design process.

Examples of different types of resources can include slices, RAMs, multipliers, and the like. By specifying the different types of resources within a PALM, a determination can be made as to whether the placement of the PALM is feasible based upon the resources to be assigned to it and the resources available at the physical location of the IC to which the PALM is assigned. This can aid in top level floorplanning. With respect to routing information, this can range from estimates of delays as described herein to actual delay calculations depending upon whether routing information is available and the extent of such information.

Figure 8:
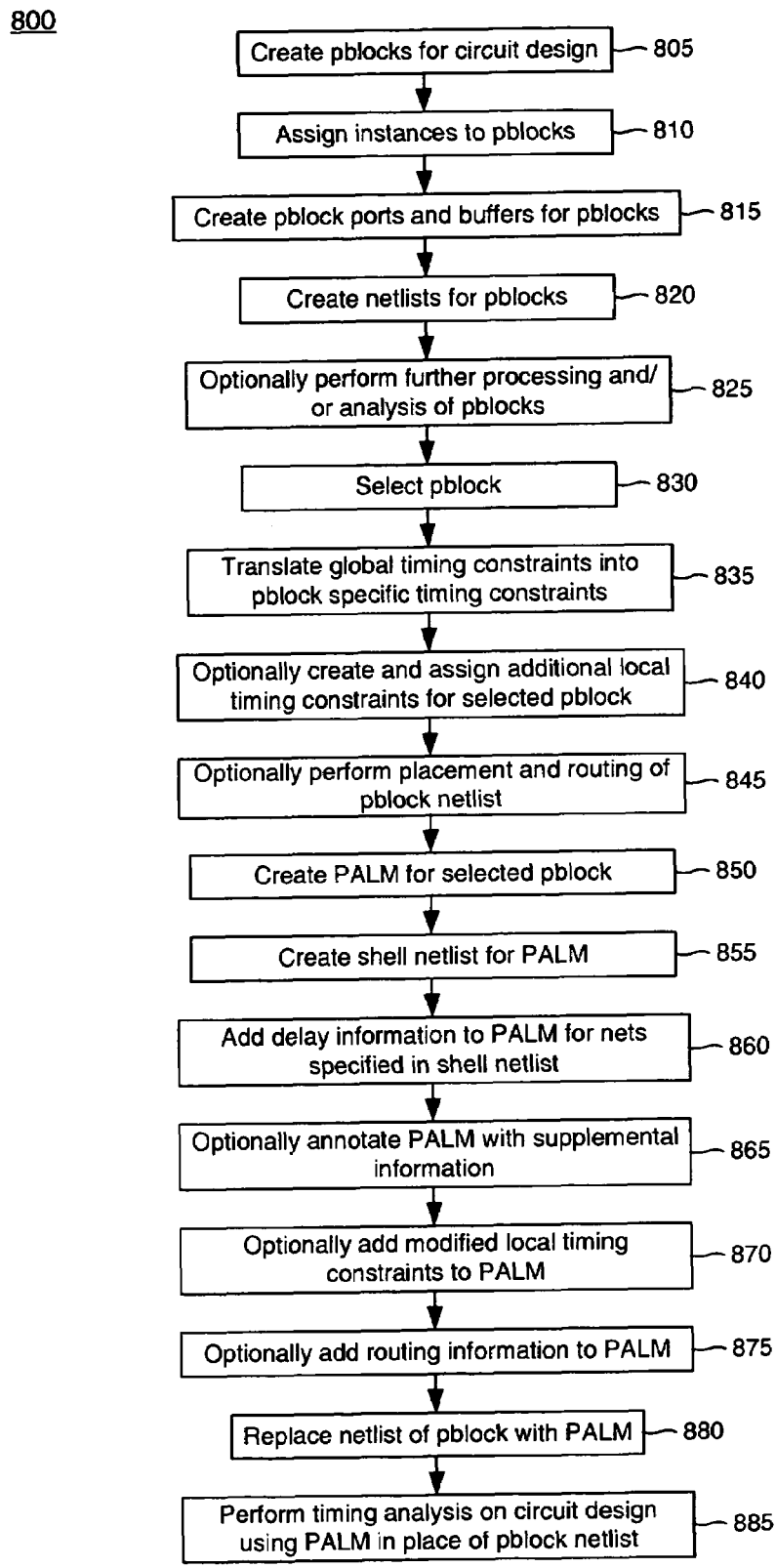
FIG. 8 is a flow chart illustrating a method of performing timing analysis on a circuit design for an IC in accordance with the inventive arrangement disclosed herein.

FIG. 8 is a flow chart illustrating a method 800 of performing timing analysis on a circuit design for an IC in accordance with the inventive arrangements disclosed herein. The method can begin in step 805, where one or more pblocks can be created for a given circuit design. As noted, a pblock is a hierarchical physical instance corresponding to a defined area on a device, such as an FPGA. In step 810, instances of logic hierarchies can be assigned to each pblock. In step 815, pblock ports, buffers, and nets can be created for each pblock based upon the particular instances of logic hierarchies that were assigned to each pblock.

In step 820, a netlist can be generated for each pblock. A pblock netlist provides a complete logical description of a pblock including connectivity. More particularly, a pblock netlist specifies which instances have been assigned to the pblock, the connectivity among the instances within the pblock, and the connectivity between the instances and portions of the circuit design which are external to the pblock. In step 825, further processing of the pblocks optionally can be performed. In illustration, since each pblock can be considered an independent design, each can be provided to a place and route tool independently of the others. Alternatively, timing analysis can be performed on each pblock, on one or more pblocks, or on the entire circuit design.

In step 830, a pblock can be selected. In step 835, relevant global timing constraints for the circuit design can be translated into local timing constraints that are pblock specific, i.e. for the selected pblock. If a global timing constraint pertains to one or more different pblocks, the global timing constraint can be subdivided so that the timing constraint is apportioned among each of the pblocks relating to that global timing constraint. Thus, if a timing constraint relates to a signal path which runs through three pblocks, a part of the global timing constraint can be apportioned to each of the three pblocks, thereby creating one or more local timing constraints. Each resulting local timing constraint pertains only to one pblock. That is, the local timing constraint(s) can be pblock specific and are not dependent upon other pblocks or other portions of the circuit design.

In step 840, additional local timing constraints optionally can be created and assigned to the selected pblock. This allows designers to create additional timing constraints for one or more specific pblocks. In step 845, the pblock netlist optionally can be placed and routed. In step 850, a PALM can be created for the selected pblock. The PALM can be considered an abstraction of a pblock, representing the particular pblock from which it was derived.

In step 855, a shell netlist can be created for each PALM. As noted, the shell netlist can specify only those components necessary for performing global timing analysis. Taking a perspective from the boundary of the PALM and following signal paths inward, the shell netlist can specify ports, and any elements disposed in the signal path up to, and including, a first storage element. Thus, the shell netlist can include elements such as combinational logic, nets, and first level flip flops or the like. The shell netlist does not specify any nets or other structures located deeper within the PALM than the first level storage elements.

In step 860, delay information for nets specified in the shell netlist can be added to the PALM. As noted, depending upon the stage of development of the circuit design, the delay information can be composed of estimates of the delays for nets, calculations of delays based upon rough routing approximations, or actual calculations for physical nets that have been routed. In step 865, the PALMs optionally can be annotated with additional information such as the number and type of the resources that are assigned to each PALM. This allows top level floorplanning to be performed using the PALM structures.

In step 870, any modified timing constraints, as may be specified by a designer, optionally can be included in the PALM. In step 875, routing information optionally can be added to the PALM. As noted, if routing information is available, such information can be included. The amount and/or specificity of routing information that is available for the nets specified by the shell netlist will vary according to the stage of development to which the development process has progressed.

In step 880, the netlist for the pblock represented by the PALM can be replaced with the PALM itself. In step 885, a global timing analysis can be performed upon the entire circuit design. Because the PALM specifies the shell netlist and delays for the nets specified in the shell netlist, the PALM can be used in place of the netlist of the pblock.

The method of FIG. 8 has been provided for purposes of illustration only. As such, it is not intended to limit the scope of the present invention. One or more steps of the method may be performed in varying order while still keeping with the spirit of the invention. For example, pblock specific timing constraints can be created after the creation of a PALM. Further, while the method has been described with reference to the creation of a single PALM from a selected pblock, the present invention is not so limited. If desired, multiple PALMs can be created for a circuit design or one PALM can be created for each pblock.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software application, and/or any variants thereof, in the present context, mean any expression, in any language, code or notation, of a set of instructions intended to cause a system having an information processing capability to perform a particular function either directly or after either or both of the following: a) conversion to another language, code, or notation; or b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of performing timing analysis on a circuit design for an integrated circuit (IC) comprising:
    selecting a physical block of the circuit design, wherein the physical block includes at least one instance of a logic hierarchy;
    generating a local timing constraint specific to the physical block, wherein the local timing constraint is a function of a pre-routing estimate of a global timing constraint involving the physical block,
    wherein the local timing constraint specifies a portion of the global timing constraint corresponding to a portion of a signal path covered by the global timing constraint, wherein the portion of the signal path is defined by a first endpoint that is a top level port of the physical block and a second endpoint that is a first encountered circuit element, on the signal path within the physical block, comprising memory;
    creating a software representation of the physical block, wherein the software representation specifies the local timing constraint and a shell netlist for the physical block,
    wherein the shell netlist specifies top level ports of the physical block and elements disposed in signal paths extending from each of the top level ports of the physical block up to, and including, a first encountered circuit element comprising memory within the physical block; and
    performing a timing analysis upon, at least part of, the circuit design using the software representation.

2. The method of claim 1, said generating step further comprising modifying a global timing constraint of the circuit design thereby resulting in the local timing constraint, wherein the local timing constraint pertains only to the physical block.

3. The method of claim 1, said generating step further comprising determining the local timing constraint by multiplying the global timing constraint by a factor determined from a ratio of a delay of the portion of the signal path to a delay of the signal path.

4. The method of claim 3, wherein the global timing constraint is associated with a defined signal path, said determining step further comprising calculating the part of the global timing constraint attributable to the physical block using a function that depends, at least in part, upon a delay estimate of the defined signal path and a delay estimate of a part of the defined signal path involving the physical block.

5. The method of claim 1, wherein the local timing constraint is not derived from a global timing constraint and pertains only to the physical block.

6. The method of claim 1, wherein the software representation includes delays of nets specified in the shell netlist.

7. A method of performing timing analysis on a circuit design for an integrated circuit (IC) comprising:
    generating at least one local timing constraint for a data structure representing a physical area of at least part of the circuit design on the IC, wherein the local timing constraint is a function of a pre-routing estimate of a global timing constraint involving the physical area of at least part of the circuit design on the IC,
    wherein the local timing constraint specifies a portion of the global timing constraint corresponding to a portion of a signal path covered by the global timing constraint, wherein the portion of the signal path is defined by a first endpoint that is a top level port of the physical block and a second endpoint that is a first encountered circuit element, on the signal path within the physical block, comprising memory;
    determining a shell netlist for the data structure,
    wherein the shell netlist specifies top level ports of the data structure, nets, and combinational logic extending from each top level port up to, and including, a first encountered circuit element comprising memory within the data structure;
    defining a software-based model of the data structure;
    associating the shell netlist and the at least one local timing constraint with the software-based model; and
    replacing a netlist for the data structure with the software-based model when estimating timing information for at least a portion of the circuit design.

8. The method of claim 7, wherein the software-based model specifies a physical area of the IC and logical attributes.

9. The method of claim 7, said generating step further comprising determining the local timing constraint by multiplying the global timing constraint by a factor determined from a ratio of a delay of the portion of the signal path to a delay of the signal path.

10. The method of claim 7, wherein the local timing constraint is not derived from a global timing constraint and pertains only to the data structure.

* * * * *